(12) United States Patent
Choi et al.

(10) Patent No.: US 7,528,644 B2
(45) Date of Patent: May 5, 2009

(54) TEMPERATURE DETECTING CIRCUIT (75) Inventors: Jong-Hyun Choi, Suwon-si (KR); Dong-Il Seo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 11/482,448

(22) Filed: Jul. 7, 2006

(65) Prior Publication Data
US 2007/0098042 A1    May 3, 2007

(30) Foreign Application Priority Data
Oct. 17, 2005    (KR) .................. 10-2005-0097659

(51) Int. Cl.
*H01L 35/00* (2006.01)
(52) U.S. Cl. ..................... 327/512; 327/513
(58) Field of Classification Search .......... 327/509, 327/512–513
See application file for complete search history.

(56) References Cited

U.S. PATENT DOCUMENTS 6,707,745 B2    3/2004    Mizugaki ................ 365/222
6,756,856 B2    6/2004    Song et al. .............. 331/176
7,410,293 B1 *  8/2008    Santurkar et al. ........ 374/178

FOREIGN PATENT DOCUMENTS

KR    1020030070687    9/2003

* cited by examiner

*Primary Examiner*—Dinh T. Le
(74) *Attorney, Agent, or Firm*—F. Chau & Assoc., LLC (57) ABSTRACT

A temperature detecting circuit is provided. The temperature detecting circuit includes a reference and detection voltage generator for generating a reference voltage corresponding to a first and a second reference current, and changing first to M-th (M being a natural number) detection currents based on first to M-th temperature detection codes to generate first to M-th detection voltages corresponding to the changed first to M-th detection currents and the second reference current; a temperature detection signal generator for comparing each of the first to M-th detection voltages with the reference voltage to generate first to M-th temperature detection signals; and a temperature detection controller for detecting an operation temperature of a semiconductor device while changing the first to M-th temperature detection codes in response to the first to M-th temperature detection signals from the temperature detection signal generator.

20 Claims, 6 Drawing Sheets

TEMPERATURE DETECTING CIRCUIT

CROSS-REFERENCE TO RELATED APPLICATIONS

This U.S. non-provisional patent application claims priority under 35 U.S.C. § 119 of Korean Patent Application 2005-97659 filed on Oct. 17, 2005, the entire content of which is hereby incorporated by reference.

BACKGROUND

1. Field of the Invention

The disclosure herein is directed to a temperature detecting circuit, and more particularly, to a temperature detecting circuit capable of more precisely detecting the operation temperature of a semiconductor device.

2. Description of the Related Art

Semiconductor devices such as dynamic random access memories (DRAMs) refresh data stored in memory cells to continuously maintain the stored data. In the art, this is known as a self-refresh operation. In a self-refresh operation, current flows inside the device, which causes power consumption. There is a need in the art to reduce this power consumption so as to reduce power consumption in the semiconductor devices.

Recently, a semiconductor device was introduced having a temperature detecting circuit with a bandgap reference circuit for changing the self-refresh period depending on the operating temperature of the semiconductor device, thereby minimizing the power consumption caused by the self-refresh current.

Figure 1:
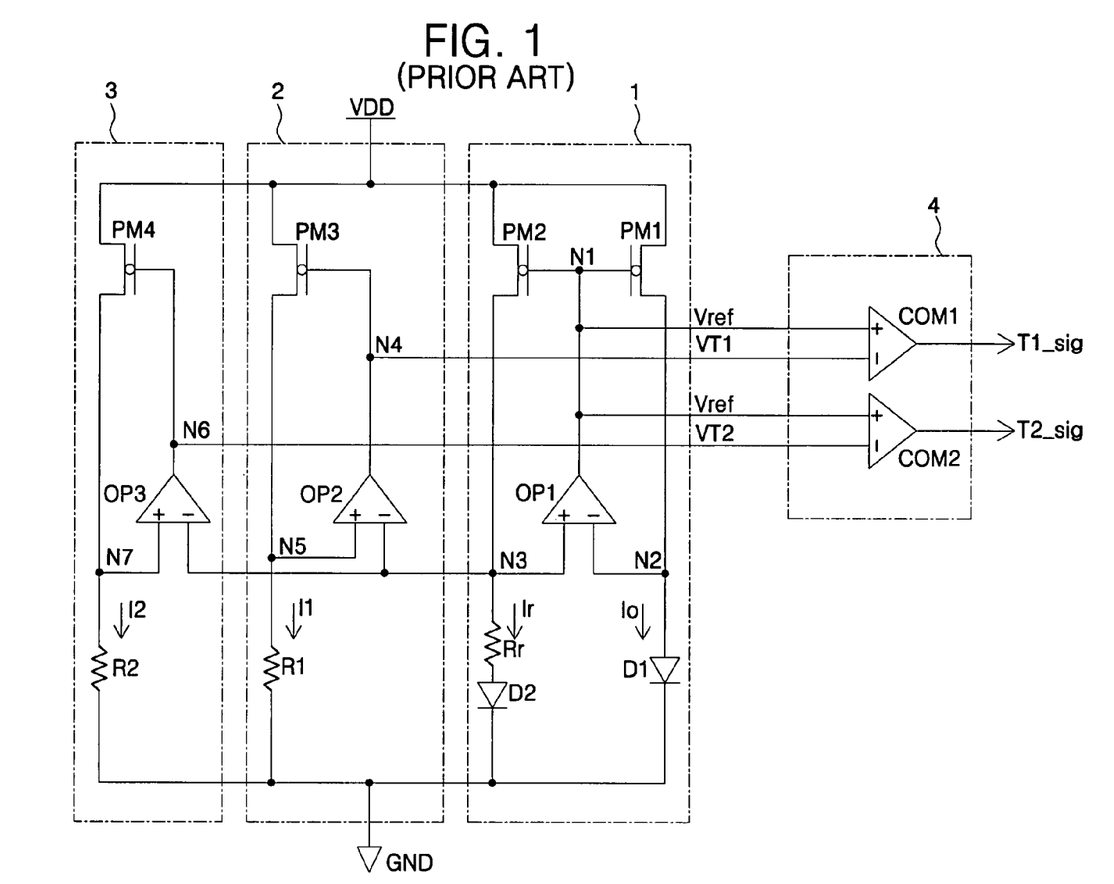
FIG. 1 illustrates a conventional temperature detecting circuit.

FIG. 1 illustrates a conventional temperature detecting circuit having a bandgap reference circuit.

Referring to FIG. 1, the temperature detecting circuit includes a reference voltage generator 1 for generating a reference voltage Vref corresponding to reference current Ir. The temperature detecting circuit further includes a first detection voltage generator 2 for generating a first detection voltage VT1 corresponding to a first detection current I1, a second detection voltage generator 3 for generating a second detection voltage VT2 corresponding to second detection current I2, and a temperature detection signal generator 4 for comparing each of the first and second detection voltages VT1 and VT2 with the reference voltage Vref to generate first and second temperature detection signals T1_sig and T2_sig.

The reference voltage generator 1 includes a first PMOS transistor PM1 having a source to which a power supply voltage VDD is applied, a gate connected to a first node N1, and a drain connected to a second node N2; a second PMOS transistor PM2 having a source to which the power supply voltage VDD is applied, a gate connected to the first node N1, and a drain connected to a third node N3; a first diode D1 connected in series between the second node N2 and a ground voltage GND; a reference resistor Rr and a second diode D2 connected in series between the third node N3 and the ground voltage GND; and a first operational (OP) amplifier OP1 having an output terminal connected to the first node N1, (−) input terminal connected to the second node N2, and a (+) input terminal connected to the third node N3.

The first detection voltage generator 2 includes a third PMOS transistor PM3 having a source to which the power supply voltage VDD is applied, a gate connected to a fourth node N4, and a drain connected to a fifth node N5; a first resistor R1 connected in series between the fifth node N5 and the ground voltage GND; and a second OP amplifier OP2 having an output terminal connected to the fourth node N4, a (+) input terminal connected to the fifth node N5, and an (−) input terminal connected to the third node N3. The second detection voltage generator 3 includes a fourth PMOS transistor PM4 having a source to which the power supply voltage VDD is applied, a gate connected to a sixth node N6 and a drain connected to a seventh node N7; a second resistor R2 connected in series between the seventh node N7 and the ground voltage GND, and a third OP amplifier OP3 having a (+) input terminal connected to the seventh node N7, a (−) input terminal connected to the third node N3, and an output terminal connected to the sixth node N6.

The temperature detection signal generator 4 includes a first comparator COM1 for comparing the reference voltage Vref at the first node N1 with the first detection voltage VT1 at the fourth node N4 to generate the first temperature detection signal T1_sig; and a second comparator COM2 for comparing the reference voltage Vref at the first node N1 with the second detection voltage VT2 at the sixth node N6 to generate the second temperature detection signal T2_sig.

Operation of the conventional temperature detecting circuit will now be described with reference to FIG. 1.

It is assumed that the first and second diodes D1 and D2 are the same type diodes, and W/L (width/length) of the PMOS transistors PM1, PM2, PM3 and PM4 exhibits that PM1:PM2:PM3:PM4=M:1:M:M.

Since current input to the input terminals of the operational amplifiers may be neglected, currents flowing into the second, third, fifth and seventh nodes N2, N3, N5 and N7 are the same as those flowing into the drains of the PMOS transistors PM1, PM2, PM3 and PM4, respectively. Current ratio exhibits N2:N3:N5:N7=M:1:M:M depending on the W/L of the PMOS transistors PM1, PM2, PM3 and PM4.

Current flowing through each turned-on diode may be represented by the following Equation 1:

$$I=Is\ exp[VD/VT] \qquad \text{Equation 1}$$

where Is indicates reverse saturation current of the diode, VD indicates a voltage across the diode, and VT indicates a thermal voltage having a value of (k×T)/q. k indicates constant, T indicates a temperature, and q indicates charge.

Since all voltages at the input terminals of the operational amplifiers are the same, all voltages at the second, third, fifth and seventh nodes N2, N3, N5 and N7 are the same and the following Equation 2 is obtained:

$$V(N2)=V(N3)=Ir\times Rr+VD1=VD2, \qquad \text{Equation 2}$$

where VD1 indicates a voltage across the first diode D1, and VD2 indicates a voltage across the second diode D2.

Since Io=Is exp[VD2/VT], VD2=VT×ln(Io/Is). Since Ir=Is exp[VD1/VT], VD1=VT×ln((Io/M)/Is). Accordingly, Ir may be represented by the following Equation 3 from Equation 2.

$$Ir=(VT\times ln(M))/Rr \qquad \text{Equation 3}$$

It can be seen that Ir is proportional to the temperature and inversely proportional to the resistance.

Further, since all the voltages at the second, third, fifth and seventh nodes N2, N3, N5 and N7 are the same, the voltages at the second, fifth and seventh nodes N2, N5 and N7 are the same as the voltage at the third node N3, and the voltage at the third node N3 is the same as the voltage VD2 across the second diode D2. Thus, the voltage at the third node N3 becomes "VT×ln(Io/Is)".

Generally, when a temperature is elevated, Is increases at a greater rate compared to the thermal voltage VT of the diode and the voltage across the diode decreases. Accordingly, all of the voltage at the third node N3 and the voltages at the second, fifth and seventh nodes N2, N5 and N7 are reduced. This reduces the first and second detection currents I1 and I2 flowing through the first and second resistors R1 and R2 according to an equation, I=V/R. As a result, it can be seen that the first and second detection currents I1 and I2 are reduced as the temperature is elevated.

Figure 2:
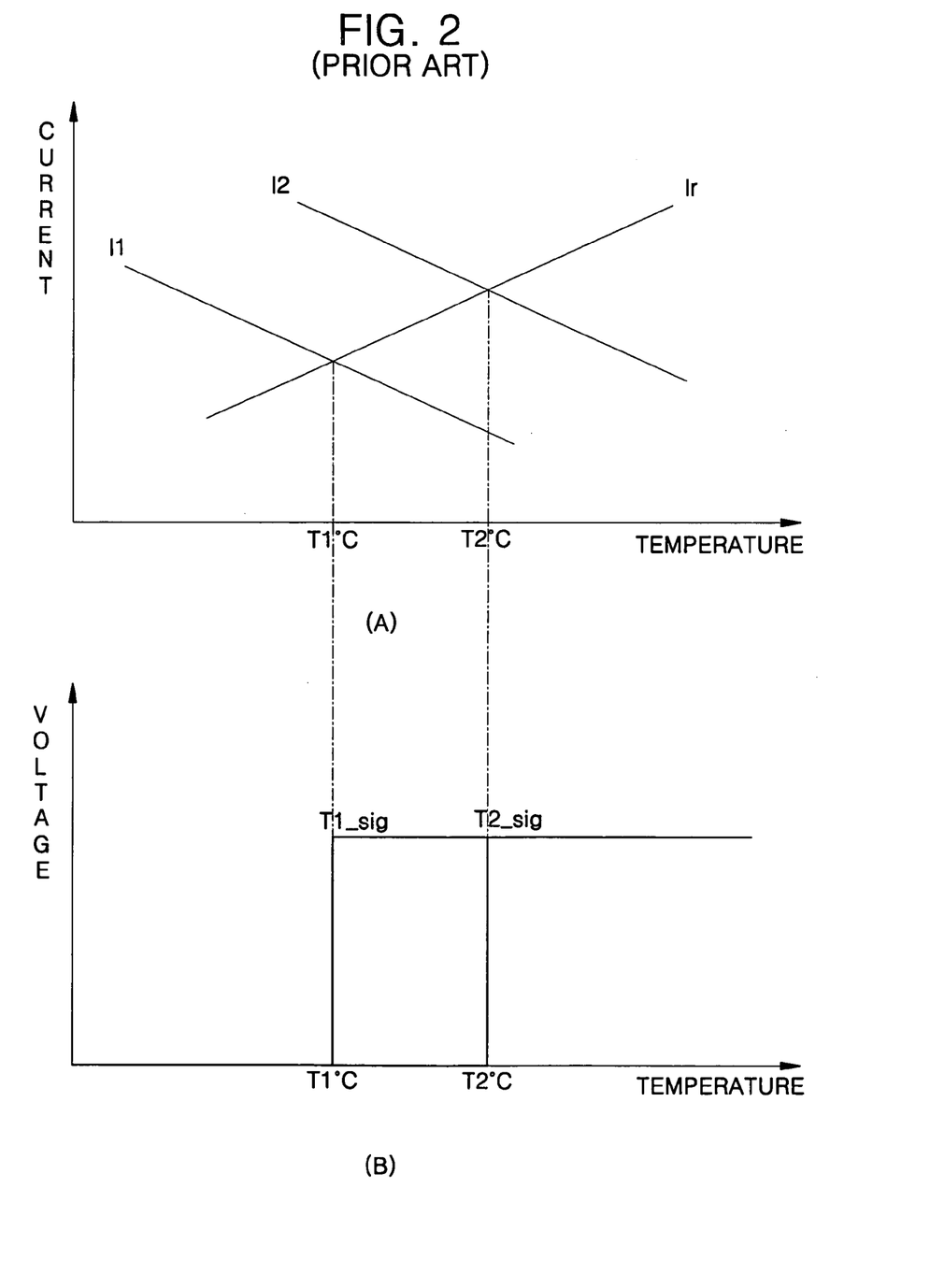
FIG. 2 illustrates temperature-current characteristics and temperature detection signals dependent on the temperature-current characteristics in a conventional temperature detecting circuit.

The temperature detecting circuit of FIG. 1 is able to detect the operation temperature of the semiconductor device based on the characteristic that, as the temperature is elevated, the reference current Ir increases but the first and second detection currents I1 and I2 decrease, as shown in FIG. 2A.

In this case, the temperature at which the first detection current I1 and the reference current Ir intersect becomes a first set temperature T1, and a temperature at which a second detection current I2 and the reference current Ir intersect becomes a second set temperature T2.

The first, second and third OP amplifiers OP1, OP2 and OP3 output the reference voltage Vref, the first detection voltage VT1, and the second detection voltage VT2 corresponding to the reference current Ir, the first detection current I1, and the second detection current I2 at the first, fourth, and sixth nodes N1, N4 and N6, respectively.

As in FIG. 2B, the first comparator COM1 compares the reference voltage Vref to the first detection voltage VT1 to enable the first temperature detection signal T1_sig when the semiconductor device operates at a temperature higher than the first set temperature T1, and the second comparator COM2 compares the reference voltage Vref to the second detection voltage VT2 to enable the second temperature detection signal T2_sig when the semiconductor device operates at a temperature higher than the second set temperature T2.

The first and second temperature detection signals T1_sig and T2_sig are input to a self-refresh period variable circuit (not shown), which is implemented by for example a counter, to change the self-refresh period of the semiconductor device.

As described above, the conventional temperature detecting circuit detects the operation temperature of the semiconductor device and notifies the self-refresh period variable circuit of the detected operation temperature of the semiconductor device so that the self-refresh period is changed according to the operation temperature of the semiconductor device.

However, the conventional temperature detecting circuit cannot precisely detect operational changes in the temperature of the semiconductor device because the set temperatures are fixed in too great of a temperature detection scale. Accordingly, it is impossible to select and set a self-refresh period that is suitable for the operation temperature of the semiconductor device.

For example, when the first set temperature T1 of the temperature detecting circuit is 10° C., the second set temperature T2 is 50° C., and the operation temperature of the semiconductor device is 45° C., the temperature detecting circuit detects that the semiconductor device operates at a temperature higher than 10° C. to enable only the first temperature detection signal T1_sig. The self-refresh period variable circuit then selects and sets a self-refresh period that is suitable for the semiconductor device operating between 10° C. and 50° C.

However, it is desirable that the actual self-refresh is performed according to a self-refresh period that is suitable for the semiconductor device operating over 45° C. since the operation temperature of the semiconductor device is 45° C.

As described above, with the conventional temperature detecting circuit, it is impossible to precisely select and set a self-fresh period that is suitable for the operation temperature of a semiconductor device. Thus, power consumption caused by self-refresh current may be unnecessarily increased or data stored in memory cells may be lost.

SUMMARY OF THE INVENTION

An aspect of the present invention is to provide a temperature detecting circuit including: a reference and detection voltage generator for generating a reference voltage corresponding to reference current, and changing first to M-th (M being a natural number) detection currents based on first to M-th temperature detection codes to generate first to M-th detection voltages corresponding to the changed first to M-th detection currents; a temperature detection signal generator for comparing each of the first to M-th detection voltages with the reference voltage to generate first to M-th temperature detection signals; and a temperature detection controller for detecting an operation temperature of a semiconductor device while changing the first to M-th temperature detection codes in response to the first to M-th temperature detection signals from the temperature detection signal generator.

The reference and detection voltage generator may include a reference voltage generator for generating the reference voltage corresponding to the reference current; and first to M-th detection voltage generators for changing the first to M-th detection currents based on the first to M-th temperature detection codes to generate the first to M-th detection voltages corresponding to the changed first to M-th detection currents.

The reference voltage generator may include a first transistor connected to a first node and a second node to apply a first reference current to the second node; a second transistor connected to the first node and a third node to apply a second reference current to the third node; a first diode connected between the second node and a ground voltage to determine an amount of the first reference current flowing through the second node; a second diode and a resistor connected between the third node and the ground voltage to determine an amount of the second reference current flowing through the third node; and a reference voltage generation unit for generating the reference voltage according to the amounts of the first and second reference currents flowing through the second and third nodes.

Each of the first to M-th detection voltage generators may include: a third to M-th transistor connected to a fourth to M-th node to apply a detection current corresponding to a detection voltage to the fourth to M-th node; a variable resistor circuit connected between a fifth to M-th node and the ground voltage to change an amount of the detection current flowing through the fifth to M-th node according to the temperature detection code; and a reference voltage generation unit for generating the detection voltage according to the amounts of the reference current and the detection current flowing through the third and fifth to M-th nodes.

The variable resistor circuit may include a predetermined number of resistors connected in series; and a predetermined number of transistors connected in parallel with the predetermined number of resistors, respectively.

BRIEF DESCRIPTION OF THE DRAWINGS

Embodiments of the present invention will be described with reference to the following figures, wherein like reference numerals refer to like parts throughout the various figures unless otherwise specified. In the figures.

DETAILED DESCRIPTION OF THE PREFERRED EMBODIMENTS

Preferred embodiments of the invention will be described below in more detail with reference to the accompanying drawings. The invention may, however, be embodied in different forms and should not be constructed as limited to the embodiments set forth herein.

Figure 3:
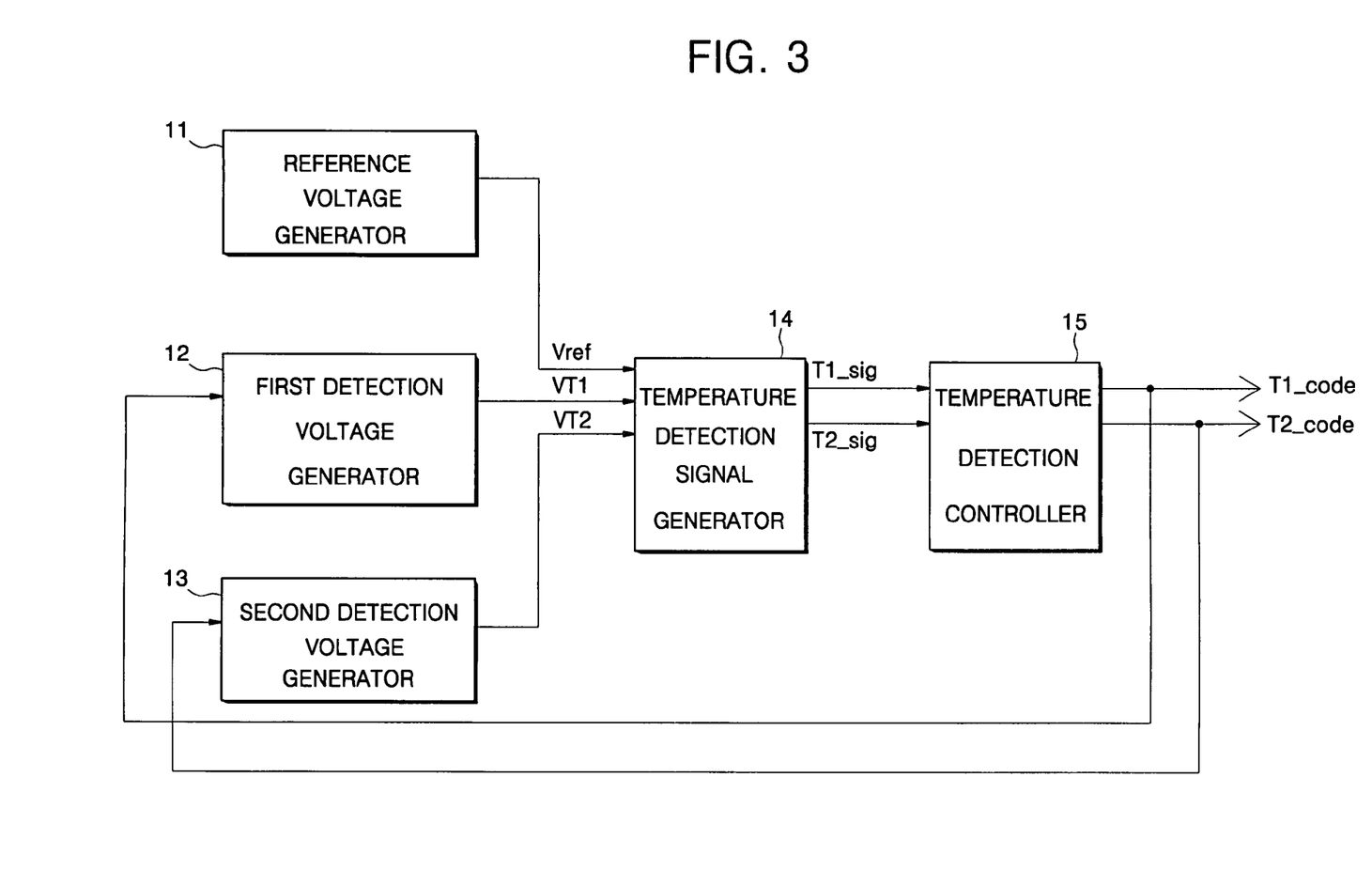
FIG. 3 illustrates a block diagram of a temperature detecting circuit according to an embodiment of the present invention.

FIG. 3 illustrates a block diagram of a temperature detecting circuit having a bandgap reference circuit according to an embodiment of the present invention;

Referring to FIG. 3, the temperature detecting circuit includes a reference voltage generator 11, a first detection voltage generator 12, a second detection voltage generator 13, a temperature detection signal generator 14, and a temperature detection controller 15.

The reference voltage generator 11 generates a reference voltage Vref corresponding to reference current Ir. The first detection voltage generator 12 changes a first detection current I1 to detect a first set temperature T1 according to a first temperature detection code T1_code to generate a first detection voltage VT1 corresponding to the first changed detection current I1. The second detection voltage generator 13 changes a second detection current I2 to detect a second set temperature T2 according to a second temperature detection code T2_code to generate a second detection voltage VT2 corresponding to the second changed detection current I2.

The temperature detection signal generator 14 compares each of the first and second detection voltages VT1 and VT2 to the reference voltage Vref to generate first and second temperature detection signals T1_sig and T2_sig.

The temperature detection controller 15 sequentially increases or decreases code values of the first temperature detection code T1_code and the second temperature detection code T2_code (shown in FIG. 6) to change the first or second set temperature T1 or T2 for tracking the operation temperature of the semiconductor device. When the operation temperature of the semiconductor device is obtained, the temperature detection controller 15 stops tracking and provides the first and second temperature detection codes T1_code and T2_code to a self-refresh period variable circuit (not shown). Preferably, the first or second temperature detection codes T1_code or T2_code may be implemented by a N-bit thermometer code.

Operation of the temperature detecting circuit of FIG. 3 will now be described.

Figure 4:
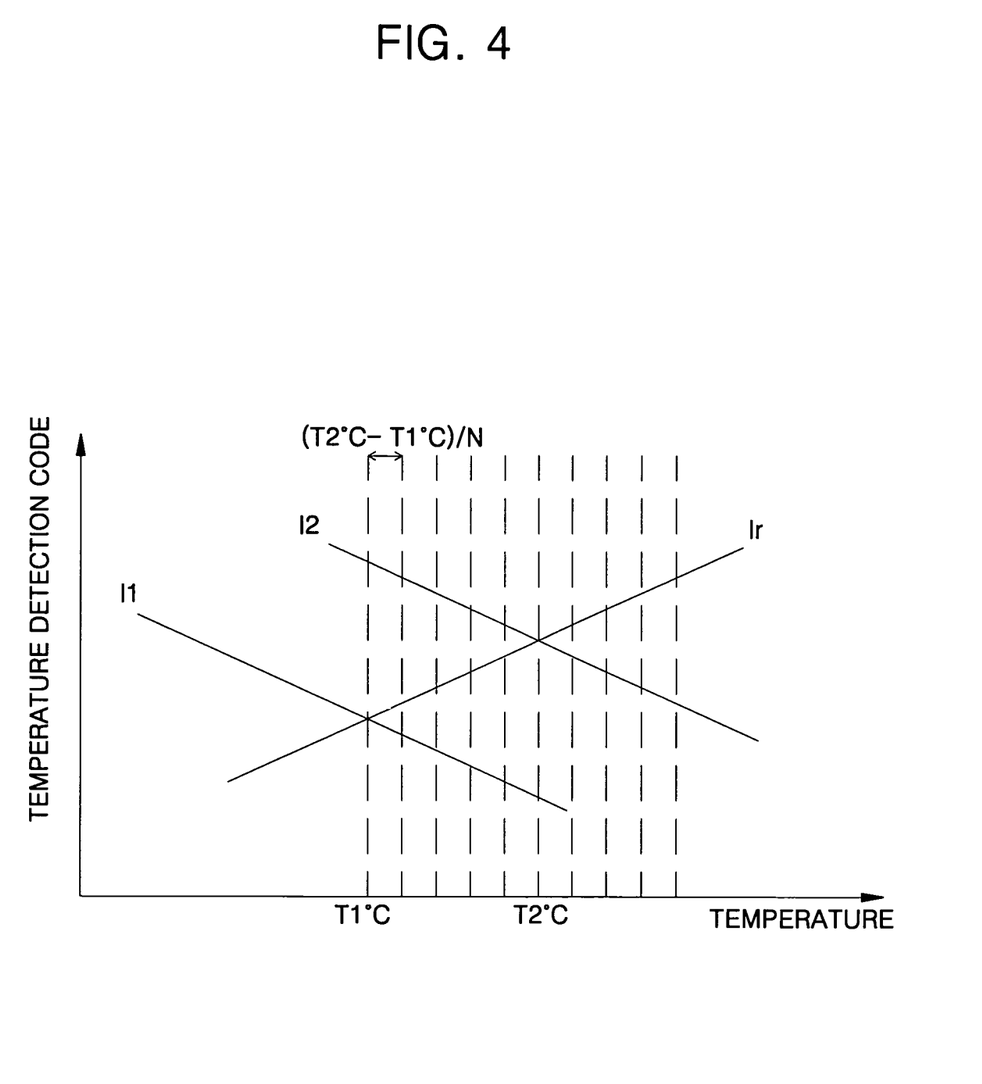
FIG. 4 illustrates temperature-current characteristics of the temperature detecting circuit of FIG. 3.

Given that the first and second temperature detection codes T1_code and T2_code are N (N being a natural number)-bit thermometer codes, the first and second set temperatures are T1 and T2, respectively, as shown in FIG. 4, and the first and second temperature detection signals T1_sig and T2_sig are enabled when the operation temperature of the semiconductor device is higher than the first and second set temperatures T1 and T2 and disabled when it is lower than the first and second set temperatures T1 and T2.

As the code value of the first or second temperature detection code T1_code or T2_code increases or decreases by "1," the first or second set temperatures T1 or T2 increases or decreases by $(T2-T1)/N$.

The temperature detection controller 15 sequentially increases the first temperature detection code T1_code from the smallest value (e.g., 0000) to increase the first detection current I1 of the first detection voltage generator 12 and thus increases the first set temperature T1 by $(T2-T1)/N$, and checks whether the first temperature detection signal T1_sig of the temperature detection signal generator 14 is disabled.

When the first temperature detection signal T1_sig is disabled at a predetermined temperature, the temperature detection controller 15 stops tracking operation and provides the first and second temperature detection codes T1_code and T2_code to the self-refresh period variable circuit.

Alternatively, when the first temperature detection signal T1_sig of the temperature detection signal generator 14 is not disabled and the first temperature detection code T1_code becomes the greatest value (e.g., 1111), the temperature detection controller 15 sequentially increases the second temperature detection code T2_code from the smallest value (e.g., 0000) again to increase the second detection current I2 of the second detection voltage generator 13 and thus increases the second set temperature T2 by $(T2C-T1)/N$ and checks whether the second temperature detection signal T2_sig of the temperature detection signal generator 14 is disabled.

When the second temperature detection signal T2_sig is disabled at a predetermined temperature, the temperature detection controller 15 stops the tracking operation and provides the first and second temperature detection codes T1_code and T2_code to the self-refresh period variable circuit.

Alternatively, when the second temperature detection signal T2_sig of the temperature detection signal generator 14 is not disabled and the second temperature detection code T2_code becomes the greatest value (e.g., 1111), the temperature detection controller 15 recognizes that the operation temperature of the semiconductor device is more than the second set temperature T2 and provides the first and second temperature detection codes T1_code and T2_code to the self-refresh period variable circuit.

The self-refresh period variable circuit receives and analyzes the first and the second temperature detection codes T1_code and T2_code of FIG. 3 to recognize the operation temperature of the semiconductor device and select a self-refresh period according to the operation temperature.

For example, when the first temperature detection code T1_code is "0111" and the second temperature detection code T2_code is "0000", the self-refresh period variable circuit recognizes that the operation temperature of the semiconductor device is $T1+((T2-T1)/N)\times$(the value of the first temperature detection code), i.e., $T1+((T2-T1)/4)\times 3$ and selects the self-refresh period according to the operation temperature.

As described above, the temperature detecting circuit of FIG. 3 detects the operation temperature of the semiconductor device in units of $(T2-T1)/N$, thereby more precisely and accurately recognizing the operation temperature of the semiconductor device.

Figure 5:
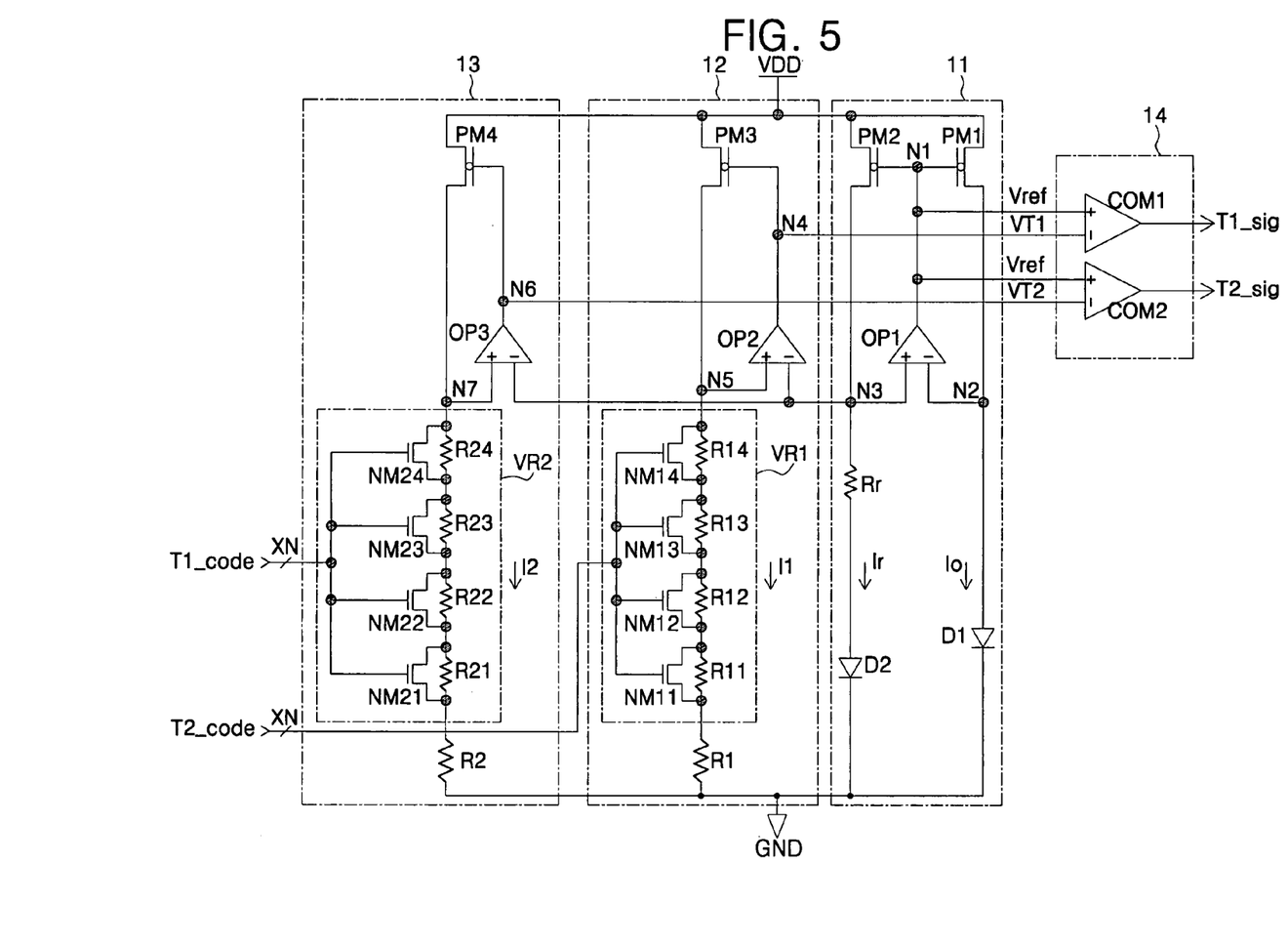
FIG. 5 illustrates a circuit of a reference voltage generator, a first detection voltage generator, and a second detection voltage generator of FIG. 3.

FIG. 5 illustrates a circuit of the reference voltage generator 11, the first detection voltage generator 12, the second detection voltage generator 13, and the temperature detection signal generator 14 of the temperature detecting circuit of FIG. 3.

Referring to FIG. 5, the reference voltage generator 11 includes a first PMOS transistor PM1 having a source to which a power supply voltage VDD is applied, a gate connected to a first node N1, and a drain connected to a second node N2; a second PMOS transistor PM2 having a source to which the power supply voltage VDD is applied, a gate connected to the first node N1, and a drain connected to a third node N3; a first diode D1 connected in series between the second node N2 and a ground voltage GND; a reference resistor Rr and a second diode D2 connected in series between the third node N3 and the ground voltage GND; and a first operational (OP) amplifier OP1 having an output terminal connected to the first node N1, (−) input terminal connected to the second node N2, and a (+) input terminal connected to the third node N3, as in FIG. 1.

The first detection voltage generator 12 includes a third PMOS transistor PM3 having a source to which the power supply voltage VDD is applied, a gate connected to a fourth node N4, and a drain connected to a fifth node N5; a first variable resistor circuit VR1 and a first resistor R1 connected in series between the fifth node N5 and the ground voltage GND; and a second OP amplifier OP2 having an output terminal connected to the fourth node N4, a (+) input terminal connected to the fifth node N5, and a (−) input terminal connected to the third node N3. The first variable resistor circuit VR1 includes eleventh to fourteenth temperature detection resistors R11 to R14 connected in series between the fifth node N5 and one end of the first resistor R1, and eleventh to fourteenth NMOS transistors NM11 to NM14 connected in parallel with the first temperature detection resistors R11 to R14, respectively.

The second detection voltage generator 13 includes a fourth PMOS transistor PM4 having a source to which the power supply voltage VDD is applied, a gate connected to a sixth node N6, and a drain connected to a seventh node N7; a second variable resistor circuit VR2 and a second resistor R2 connected in series between the seventh node N7 and the ground voltage GND; and a third OP amplifier OP3 having a (+) input terminal connected to the seventh node N7, a (−) input terminal connected to the third node N3, and an output terminal connected to the sixth node N6. The second variable resistor circuit VR2 includes twenty-first to twenty-fourth temperature detection resistors R21 to R24 connected in series between the seventh node N7 and one end of the second resistor R2, and twenty-first to twenty-fourth NMOS transistors NM21 to NM24 connected in parallel with the second temperature detection resistors R21 to R24, respectively.

Preferably, all of the eleventh to fourteenth temperature detection resistors R11 to R14 and the twenty-first to twenty-fourth temperature detection resistors R21 to R24 have the same resistance so that the first or second set temperature T1 or T2 is reduced by (T2−T1)/N as the code value of the first or second temperature detection code T1_code or T2_code increases or decrease by "1." Also, the eleventh to fourteenth temperature detection resistors R11 to R14 and the twenty-first to the twenty-fourth temperature detection resistors R21 to R24 may have different resistance values, if necessary.

The temperature detection signal generator 14 includes a first comparator COM1 for comparing the reference voltage Vref at the first node N1 with the first detection voltage VT1 at the fourth node N4 to generate the first temperature detection signal T1_sig, and a second comparator COM2 for comparing the reference voltage Vref at the first node N1 with the second detection voltage VT2 at the sixth node N6 to generate the second temperature detection signal T2_sig.

Hereinafter, the method of changing the first and second set temperatures depending on the first and second temperature detection codes T1_code and T2_code will be described with reference to FIG. 5.

Also, the first and second temperature detection codes T1_code and T2_code are 4 bit thermometer codes, the first and second diodes D1 and D2 are the same type diode, W/L (width/length) of the PMOS transistors PM1, PM2, PM3 and PM4 exhibits that PM1:PM2:PM3:PM4=M:1:M:M, and the eleventh to fourteenth temperature detection resistors R11 to R14 and the twenty-first to twenty-fourth temperature detection resistors R21 to R24 have the same resistance Rv.

The reference voltage generator 11 has the same configuration and operation as that of the reference voltage generator 1 of FIG. 1 and generates a reference current Ir according to an equation, (VT×ln(M))/Rr.

However, the resistance of the first and second variable resistor circuits VR1 and VR2 of the first and second detection voltage generators 12 and 13 is changed according to the first and second temperature detection codes T1_code and T2_code of the temperature detection controller 15, and the first and second detection currents I1 and I2 are changed according to the resistance of the first and second variable resistor circuits VR1 and VR2.

When the first temperature detection code is "0000," the eleventh through the fourteenth NMOS transistors NM11 to NM14 are turned off and the resistance of the first variable resistor circuit VR1 is "4×Rv." When the first temperature detection code is "0001," only the twelfth through the fourteenth NMOS transistors NM12 to NM14 are tuned off and the resistance of the first variable resistor circuit VR1 is "3×Rv". When the first temperature detection code is "0011," only the thirteen and fourteenth NMOS transistors NM13 and NM14 are turned off and the resistance of the first variable resistor VR is "2×Rv." When the first temperature detection code is "0111," only the fourteenth NMOS transistor NM14 is turned off and the resistance of the first variable resistor circuit VR1 becomes "Rv." When the first temperature detection code is "1111," all of the eleventh through the fourteenth NMOS transistors NM11 to NM14 are turned on and the resistance of the first variable resistor circuit VR1 becomes "0." That is, when a code value of the first temperature detection code T1_code is increased by "1," the resistance of the first variable resistor circuit VR1 is reduced by "Rv." When the code value of the second temperature detection code T2_code is increased by "1," the resistance of the second variable resistor VR2 is also reduced by "Rv," like that of the first variable resistor circuit VR1.

The first and second detection currents I1 and I2 are then sequentially increased according to "I=V/R" when the resistance of the first and second variable resistor circuits VR1 and VR2 is sequentially reduced.

Figure 6:
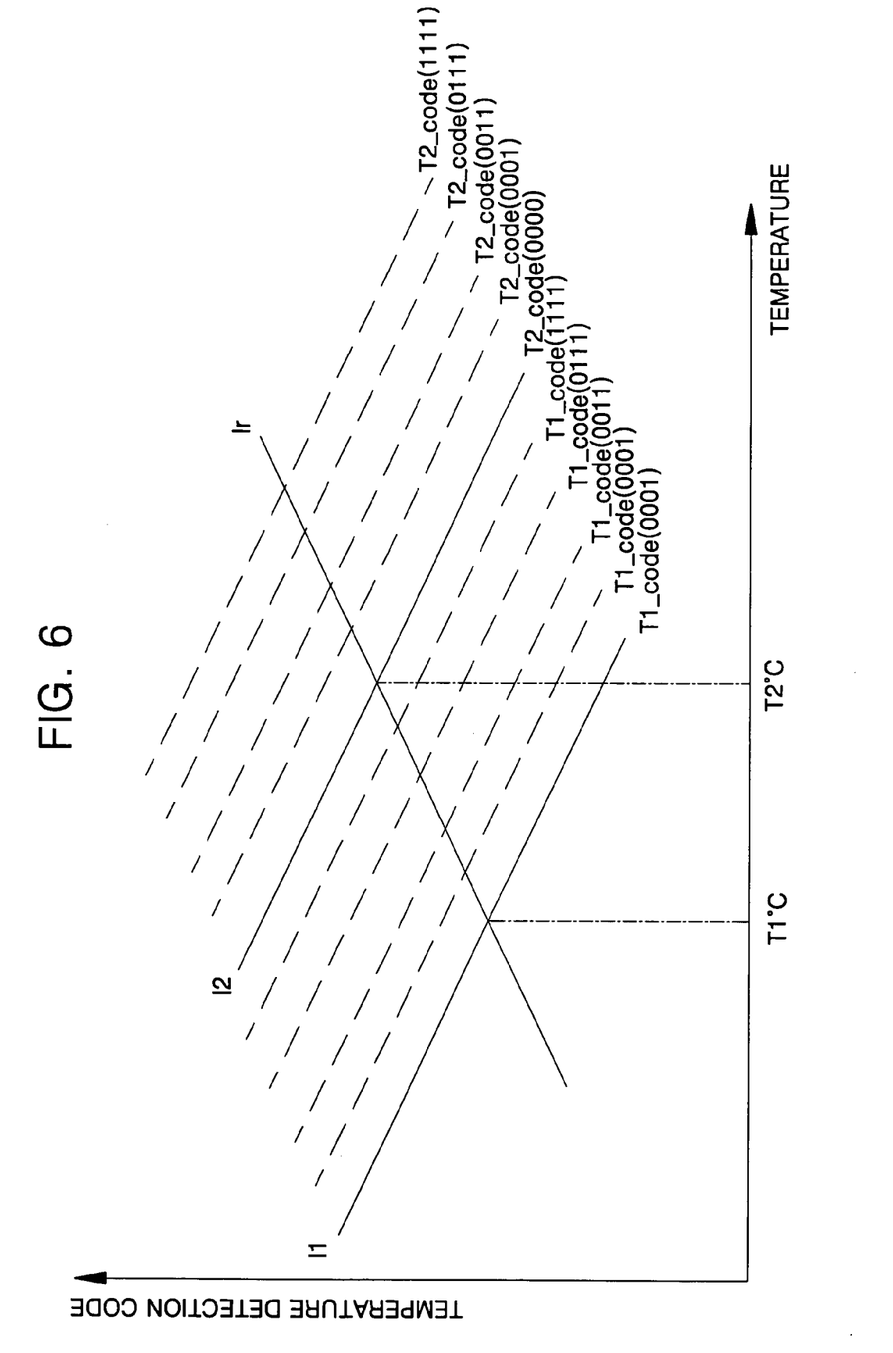
FIG. 6 illustrates temperature detection codes, which vary according to the temperature-current characteristics of the temperature detecting circuit of FIG. 5.

That is, as the code values of the first and second temperature detection codes T1_code and T2_code are sequentially increased, the first and second detection currents I1 and I2 are sequentially increased and accordingly the first and second set temperatures T1 and T2 are sequentially increased, as shown in FIG. 6.

The first OP amplifier OP1 then generates the reference voltage Vref corresponding to the reference current Ir, and the second and third OP amplifiers OP2 and OP3 generate the first and second detection voltages VT1 and VT2 corresponding to the first and second detection currents I1 and I2 changed according to the first and second temperature detection codes T1_code and T2_code.

The first comparator COM1 compares the reference voltage Vref to the first detection voltage VT1 and enables the first temperature detection signal T1_sig when the semiconductor device operates at a temperature higher than the first changed set temperature T1. The second comparator COM2 compares the reference voltage Vref to the second detection voltage VT2 and enables the second temperature detection signal T2_sig when the semiconductor device operates at a temperature higher than the second set temperature T2.

As such, the temperature detecting circuit of FIG. 5 changes the resistance of the first and second variable resistor circuits VR1 and VR2 and the first and second detection currents I1 and I2 of the first or second detection voltage generators 12 and 13 according to the first and second temperature detection codes T1_code and T2_code of temperature detection controller 15, thereby changing the first and second set temperatures T1 and T2.

In FIG. 5, the temperature detecting circuit further includes separate programming means such as a mode register setting (MRS) circuit or a fuse programming circuit to adjust all the resistors R1, R2 and R11 to R14 and R21 to R24 of the first and second variable resistor circuits to have the same resistance in the same temperature environment. A resistance difference between the resistors R1, R2 and R11 to R14 and R21 to R24 of the first and second variable resistor circuits due to manufacture process variations may be corrected in advance, such that the temperature detecting circuit of FIG. 5 can accurately track the operation temperature of the semiconductor device in units of (T2−T1)/N.

While each variable resistor circuit is implemented by a plurality of resistors and a plurality of transistors, it will be appreciated by those skilled in the art that any circuits having resistance that is variable according to the first and second temperature detection codes are applicable to the present invention.

It will be also appreciated that the first and second temperature detection codes may be any code capable of sequentially changing the resistance of the variable resistor circuits, in addition to the N-bit thermometer code.

A temperature detecting circuit of the present invention is capable of more precisely detecting a temperature of a semiconductor device by sequentially increasing or decreasing first to N-th set temperatures to more accurately track the operation temperature of the semiconductor device. This enables an optimal self-fresh period of the semiconductor device to be selected and set. Accordingly, it is possible to prevent an unnecessary increase of power consumption due to self-refresh current or loss of data stored in memory cells, in advance.

While there has been illustrated and described what are presently considered to be examplary embodiments of the present invention, it will be understood by those skilled in the art that various other modifications may be made, and equivalents may be substituted, without departing from the true scope of the invention. Therefore, it is intended that the present invention not be limited to the particular embodiments disclosed, but that the invention include all embodiments falling within the scope of the appended claims.

What is claimed is:

1. A temperature detecting circuit for use with a semiconductor device, the circuit comprising:
a reference and detection voltage generator for generating a reference voltage corresponding to a first and a second reference current, and having a variable resistance circuit for changing at least two detection currents based on at least two temperature detection codes fed thereto to generate at least two detection voltages corresponding to the changed at least two detection currents and the second reference current;
a temperature detection signal generator for comparing each of the at least two detection voltages with the reference voltage to generate at least two temperature detection signals; and
a temperature detection controller connected to the temperature detection signal generator for detecting an operating temperature of the semiconductor device and generating the at least two temperature detection codes in response to the at least two temperature detection signals, wherein the at least two temperature detection codes are output and fed back to the reference and detection voltage generator.

2. The temperature detecting circuit according to claim 1, wherein the reference and detection voltage generator comprises:
a reference voltage generator for generating the reference voltage corresponding to the first and second reference currents; and
at least two detection voltage generators having respective variable resistance circuits for changing the at least two detection currents based on the at least two temperature detection codes to generate the at least two detection voltages corresponding to the changed at least two detection currents and the second reference current.

3. The temperature detecting circuit according to claim 2, wherein the reference voltage generator comprises:
a first transistor connected between a power supply voltage and a second node, having a gate coupled to a first node, to apply a first reference current to the second node;
a second transistor connected between a power supply voltage and a third node, having a gate coupled to the first node, to apply a second reference current to the third node;
a first diode connected between the second node and a ground voltage to determine an amount of the first reference current flowing through the second node;
a second diode and a resistor connected between the third node and the ground voltage to determine an amount of the second reference current flowing through the third node; and
a reference voltage generation unit connected between the first node, the second node and the third node to output the reference voltage to the first node according to the amount of the first and second reference currents flowing though the second and third nodes, respectively.

4. The temperature detecting circuit according to claim 3, wherein the first transistor and the second transistor are PMOS transistors.

5. The temperature detecting circuit according to claim 3, wherein each of the at least two detection voltage generators comprises:
a third transistor connected between a power supply voltage and a fifth node, having a gate coupled to a fourth node, to apply a first detection current to the fifth node;
a first variable resistor circuit connected between the fifth node and the ground voltage to change an amount of the first detection current flowing through the fifth node according to a first temperature detection code from the temperature detection controller; and
a first detection voltage generation unit connected between the fourth node, the fifth node and the third node to output a first detection voltage to the fourth node according to the amount of the second reference current and the first detection current flowing through the third and fifth nodes.

6. The temperature detecting circuit according to claim 5, wherein the third transistor is PMOS transistor.

7. The temperature detecting circuit according to claim 4, wherein the variable resistor circuit comprises:
   a predetermined number of resistors connected in series; and
   a predetermined number of fourth transistors connected in parallel with the predetermined number of resistors, respectively.

8. The temperature detecting circuit according to claim 7, wherein the fourth transistors are PMOS transistors.

9. The temperature detecting circuit according to claim 7, wherein the predetermined number of resistors have the same resistance.

10. The temperature detecting circuit according to claim 5, wherein the polarity of the respective input terminals of the reference voltage generator and the at least two detection voltage generators connected to the third node are different from each other.

11. The temperature detecting circuit according to claim 1, wherein the temperature detection controller stops changing the at least two temperature detection codes to output an at least first and second temperature detection codes when the operation temperature of the semiconductor device is detected.

12. The temperature detecting circuit according to claim 1, wherein the temperature detection controller sequentially increases the code value in order from the first temperature detection code to the at least second temperature detection code.

13. The temperature detecting circuit according to claim 1, wherein the temperature detection controller sequentially decreases the code value in order from the at least second temperature detection code to the first temperature detection code.

14. The temperature detecting circuit according to claim 1, wherein each of the at least two temperature detection codes is an N-bit thermometer code.

15. The temperature detecting circuit according to claim 1, wherein the reference and detection voltage generator includes at least three operational amplifiers and at least two variable resistor circuits and the temperature detection signal generator includes at least two comparators.

16. A temperature detecting circuit for use with a semiconductor device, the circuit comprising:
   a reference and detection voltage generator for generating a reference voltage corresponding to a first and a second reference current, and having a variable resistance circuit for changing a first and a second detection current based on a first and a second temperature detection code fed thereto to generate a first and a second detection voltage corresponding to the changed first and second detection currents and the second reference current;
   a temperature detection signal generator for comparing the first and second detection voltages with the reference voltage to generate a first and a second temperature detection signal; and
   a temperature detection controller connected to the temperature detection signal generator for detecting an operation temperature of a semiconductor device and generating the first and second temperature detection codes in response to the first and second temperature detection signals, wherein the first and second temperature detection codes are output and fed back to the reference and detection voltage generator.

17. The temperature detecting circuit according to claim 16, wherein the temperature detection controller stops a tracking operation and outputs the first and second temperature detection codes when the first temperature detection signal is disabled at a predetermined temperature.

18. The temperature detecting circuit according to claim 16, wherein the temperature detection controller sequentially increases the second temperature detection code and checks whether the second temperature detection signal is disabled when the first temperature detection signal is not disabled and the first temperature detection code has reached its greatest value.

19. The temperature detecting circuit according to claim 16, wherein the temperature detection controller stops a tracking operation and outputs the first and second temperature detection codes when the second temperature detection signal is disabled at a predetermined temperature.

20. The temperature detecting circuit according to claim 16, wherein the temperature detection controller outputs the first and second temperature detection codes when the second temperature detection signal is not disabled and the second temperature detection code has reached its greatest value.

* * * * *